(12) United States Patent
Akita et al.

(10) Patent No.: US 10,191,500 B2
(45) Date of Patent: Jan. 29, 2019

(54) HOT AND COLD WATER MIXING DEVICE

(71) Applicant: PANASONIC INTELLECTUAL PROPERTY MANAGEMENT CO., LTD., Osaka (JP)

(72) Inventors: Tomohiro Akita, Osaka (JP); Daiki Matsusaki, Osaka (JP); Tatsuya Takaoka, Osaka (JP); Yoshihiro Itou, Shiga (JP); Naoki Shibata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 78 days.

(21) Appl. No.: 15/118,798

(22) PCT Filed: Feb. 4, 2015

(86) PCT No.: PCT/JP2015/000503
§ 371 (c)(1),
(2) Date: Aug. 12, 2016

(87) PCT Pub. No.: WO2015/122153
PCT Pub. Date: Aug. 20, 2015

(65) Prior Publication Data
US 2017/0052550 A1    Feb. 23, 2017

(30) Foreign Application Priority Data
Feb. 12, 2014  (JP) .................. 2014-024706

(51) Int. Cl.
*G05D 23/13*    (2006.01)
*F24D 17/00*    (2006.01)
*F16K 31/04*    (2006.01)

(52) U.S. Cl.
CPC .......... *G05D 23/132* (2013.01); *F16K 31/04* (2013.01); *F24D 17/00* (2013.01);
(Continued)

(58) Field of Classification Search
CPC .... F16K 31/04; F24D 17/00; F24D 2220/042; F24D 2220/044; G05D 23/132; G05D 23/1333; G05D 23/1353; G05D 23/1393
(Continued)

(56) References Cited

U.S. PATENT DOCUMENTS 4,885,943 A * 12/1989 Tootell .................. G01F 1/075
702/100
5,197,337 A * 3/1993 Glasheen ............. G01D 5/2013
324/174
(Continued)

FOREIGN PATENT DOCUMENTS

JP    03-198114 A    8/1991
JP    04-208321 A    7/1992
(Continued)

OTHER PUBLICATIONS

Extended European Search Report issued in corresponding European Patent Application No. 15748512.9, dated Feb. 9, 2017.
(Continued)

*Primary Examiner* — Henry Crenshaw
(74) *Attorney, Agent, or Firm* — McDermott Will & Emery LLP

(57) ABSTRACT

An object of the invention is to provide a hot and cold water mixing device for reducing degradation in the measurement accuracy of a flowmeter. In the device according to the invention, the flowmeter is disposed in one of a hot water supply path and a cold water supply path, having a higher flow rate. At least first and second temperature sensors are individually disposed in at least two of the hot and cold water supply paths and a mixed water path. A hot and cold water adjustment unit adjusts a mixing volume of hot water and cold water based on measurement values of the flowmeter disposed in one of the flow paths having a higher flow
(Continued)

rate, a mixed water path flowmeter and at least the first and second temperature sensors.

7 Claims, 11 Drawing Sheets

(52) U.S. Cl.
CPC ..... *G05D 23/1333* (2013.01); *G05D 23/1353* (2013.01); *G05D 23/1393* (2013.01); *F24D 2220/042* (2013.01); *F24D 2220/044* (2013.01)

(58) Field of Classification Search
USPC ........................................................ 236/12.1
See application file for complete search history.

(56) References Cited

U.S. PATENT DOCUMENTS

| | | | | |
|---|---|---|---|---|
| 5,406,839 | A * | 4/1995 | Leblond | G01P 13/025 73/170.02 |
| 2004/0041034 | A1 * | 3/2004 | Kemp | G05D 23/1393 236/12.12 |
| 2006/0231636 | A1 * | 10/2006 | Schmitt | F16K 19/006 236/12.11 |
| 2006/0231637 | A1 * | 10/2006 | Schmitt | B01F 5/0268 236/12.11 |
| 2006/0231638 | A1 * | 10/2006 | Belz | G05D 23/1393 236/12.12 |
| 2006/0236781 | A1 * | 10/2006 | Ohmi | G01F 1/42 73/861.52 |
| 2011/0088799 | A1 * | 4/2011 | Jung | E03C 1/055 137/607 |
| 2012/0216893 | A1 * | 8/2012 | Shapira | G05D 23/1393 137/605 |
| 2013/0092752 | A1 * | 4/2013 | Schumacher | B05B 1/30 239/154 |
| 2013/0174601 | A1 * | 7/2013 | Matsuo | F04D 27/001 62/498 |

FOREIGN PATENT DOCUMENTS

| | | |
|---|---|---|
| JP | 04-233609 A | 8/1992 |
| JP | H06-008488 U | 2/1994 |
| JP | 2001-090965 A | 4/2001 |
| JP | 2005-055070 A | 3/2005 |
| JP | 4295655 B | 7/2009 |
| JP | 2010-229765 A | 10/2010 |
| JP | 4780644 B2 | 9/2011 |
| JP | 2011-220571 A | 11/2011 |
| JP | 2015-113579 A | 6/2015 |
| JP | 2015-129414 A | 7/2015 |
| WO | 2010/103560 A1 | 9/2010 |
| WO | 2012/118721 A1 | 9/2012 |

OTHER PUBLICATIONS

International Search Report and Written Opinion issued in International Patent Application No. PCT/JP2015/000503; dated May 12, 2015; with English translation.
International Preliminary Report on Patentability issued in International Patent Application No. PCT/JP2015/000503; dated Aug. 16, 2016; with English translation.
Zhenhe Yao, et al. (2013), "Analysis on Flow Measurement Error during the Stage of Keeping Pressure in Cement Grouting Project," 2013 Water Conservancy and Hydropower Ground and Foundation Engineering Technology, China Water & Power Press, pp. 452-453; with English translation.
English translation of the First Office Action issued in Chinese Patent Application No. 201580008379.3, dated Aug. 9, 2018.

* cited by examiner

US 10,191,500 B2

HOT AND COLD WATER MIXING DEVICE

RELATED APPLICATIONS

This application is the U.S. National Phase under 35 U.S.C. § 371 of International Patent Application No. PCT/JP2015/000503, filed on Feb. 4, 2015, which in turn claims the benefit of Japanese Application No. 2014-024706, filed on Feb. 12, 2014, the disclosures of which Applications are incorporated by reference herein.

TECHNICAL FIELD

The present invention relates to hot and cold water mixing devices and specifically to an electrically controlled hot and cold water mixing device in a bathroom.

BACKGROUND ART

Document 1 (JP H03-198114 A) has disclosed a hot and cold water mixing device including a temperature sensor and a flowmeter in each of a hot water supply path, a cold water supply path, and a mixed water path.

The hot and cold water mixing device has used the temperature sensors disposed in all of the hot water supply path, the cold water supply path, and the mixed water path, and the flowmeters disposed in the hot water supply path and the cold water supply path to perform control so as to provide mixed water having an adjusted temperature and an adjusted flow rate.

In such a case, when the flow rate is close to the lower limit of the measurement range of the flowmeter, it becomes difficult for the flowmeter to sense flowing water, and therefore, the measurement accuracy of the flowmeter may decrease.

Therefore, conventional hot and cold water mixing devices have had a problem that obtaining mixed water having an adjusted temperature and an adjusted flow rate becomes difficult when the flow rate in the hot water supply path or in the cold water supply path decreases.

SUMMARY OF INVENTION

In view of the foregoing, an object of the present invention is to reduce degradation in the measurement accuracy of a flowmeter.

A hot and cold water mixing device according to an aspect of the present invention includes a hot water supply path which is connected to a hot water supply and which allows hot water having a set temperature set by the hot water supply to flow through, and a cold water supply path which is connected to a cold water supply and which allows cold water having an initial temperature to flow through. The hot and cold water mixing device includes a hot and cold water adjustment unit configured to mix hot water flowing from the hot water supply path and cold water flowing from the cold water supply path with each other to provide mixed water having an adjusted temperature and an adjusted flow rate. The hot and cold water mixing device includes a mixed water path which is connected to the hot and cold water adjustment unit and which allows the mixed water to flow through, a water shut-off switch configured to switch between stopping and passing of the mixed water, a mixed water path flowmeter which is disposed in the mixed water path and configured to measure the flow rate of mixed water, a flowmeter which is disposed in one of the hot water supply path and the cold water supply path which has a higher flow rate than a remaining one of the hot water supply path and the cold water supply path, the flowmeter being configured to measure a corresponding flow rate of hot water in the hot water supply path or the flow rate of cold water in the cold water supply path, and at least a first temperature sensor and a second temperature sensor which are individually disposed in at least two of the hot water supply path, the cold water supply path, and the mixed water path. The hot and cold water adjustment unit is configured to adjust a volume of hot water and a volume of cold water based on measurement values of the flowmeter disposed in one of the hot water supply path and the cold water supply path which has a higher flow rate than a remaining one of the hot water supply path and the cold water supply path, the mixed water path flowmeter, and at least the first temperature sensor and the second temperature sensor.

DESCRIPTION OF EMBODIMENTS

First Embodiment

A hot and cold water mixing device of the present embodiment will be described with reference to FIGS. 1 to 5.

An object of a hot and cold water mixing device 1 is to mix hot water set at an arbitrary temperature and supplied from a hot water supply 51 with cold water having an initial temperature and supplied from a cold water supply 52 so as to provide mixed water having an adjusted temperature.

The hot and cold water mixing device 1 is used to supply mixed water having an adjusted temperature to a shower and/or a tap installed in, for example, a bathroom for home use.

Figure 1:
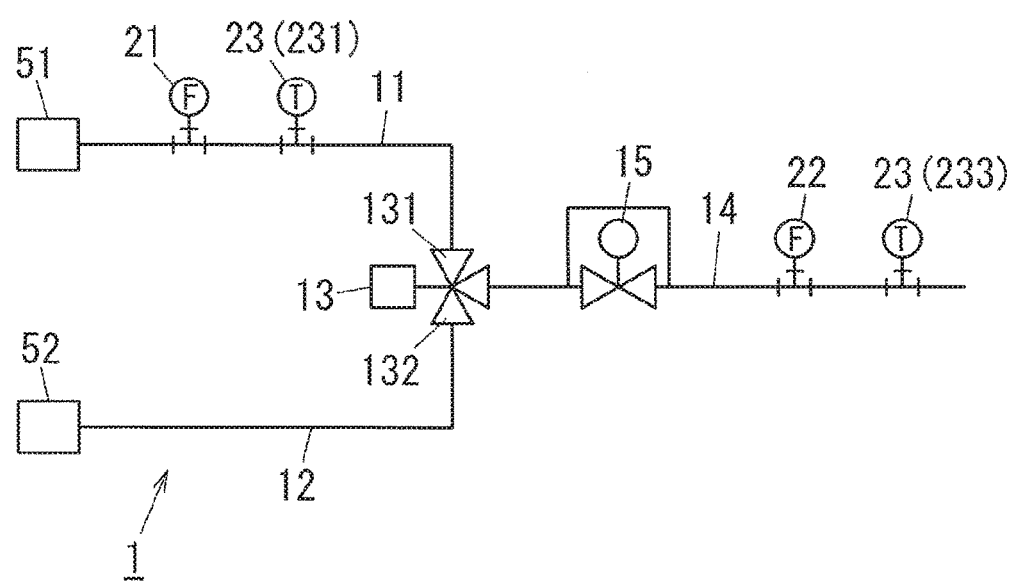
FIG. 1 is a conceptual view illustrating a hot and cold water mixing device of a first embodiment.

As illustrated in FIG. 1, the hot and cold water mixing device 1 includes a hot water supply path 11 which is connected to the hot water supply 51 and which allows hot water having a set temperature set by the hot water supply 51 to flow through, and a cold water supply path 12 which allows cold water having an initial temperature and supplied from the cold water supply 52 to flow through.

Examples of the hot water supply 51 include, but are not limited to, commercially available, common apparatuses such as electric water heaters, gas water heaters, hot water storage tanks, and instant water heaters. In the hot water supply 51, cold water supplied to the hot water supply 51 is heated by burning gas or by an electrothermal heater to increase the temperature of the cold water to an arbitrary set temperature to obtain hot water. Then, the hot water is supplied to the hot water supply path 11.

Examples of the cold water supply 52 include facilities such as waterworks and water storage tanks, but a water supply to the cold water supply path 12 is not particularly limited.

The hot and cold water mixing device 1 includes a hot and cold water adjustment unit 13 configured to mix hot water flowing through the hot water supply path 11 and cold water flowing through the cold water supply path 12 with each other to provide mixed water having an adjusted temperature and an adjusted flow rate. The hot and cold water adjustment unit 13 may include, for example, a cold water supply control valve 132 and a hot water supply control valve 131.

The cold water supply control valve 132 is connected to the cold water supply path 12 to control the flow rate of cold water flowing through the cold water supply path 12. The hot water supply control valve 131 is connected to the hot water supply path 11 to control the flow rate of hot water flowing through the hot water supply path 11.

The cold water supply control valve 132 and the hot water supply control valve 131 are preferably electrically operated valves, respective valve travels of which are adjustable by electric motors (motors). As the cold water supply control valve 132 and the hot water supply control valve 131, commercially available, common electrically operated valves are accordingly used.

The configuration of the hot and cold water adjustment unit 13 has been illustrated with reference to a configuration in which two electrically operated valves are used to adjust the flow rate and the temperature of mixed water, but the configuration of the hot and cold water adjustment unit 13 is not limited to the configuration illustrated above.

The hot and cold water mixing device 1 includes a mixed water path 14 which is connected to the hot and cold water adjustment unit 13 and which allows mixed water to flow through.

The hot and cold water mixing device 1 includes a water shut-off switch 15 configured to switch between stopping and passing of mixed water flowing through the mixed water path 14. Supply of mixed water to a shower or a tap can be started or stopped by using the water shut-off switch 15.

For example, when cold water no longer flows through the cold water supply control valve 132 due to a failure of the cold water supply control valve 132, hot water having a high temperature flows to the mixed water path 14. In this case, the mixed water path 14 is brought into a state in which water is stopped by the water shut-off switch 15 so that no hot water having a high temperature flows through the mixed water path 14.

The water shut-off switch 15 includes a solenoid valve capable of switching between opening and closing of its valve. As the water shut-off switch 15, a commercially available, common solenoid valve is accordingly used.

The hot and cold water mixing device 1 includes a controller 18 (see FIG. 5) including a microcomputer. The controller 18 is electrically connected to the hot and cold water adjustment unit 13, the water shut-off switch 15, a flowmeter 21, a mixed water path flowmeter 22, and temperature sensors 23 which will be described later.

The controller 18 controls respective valve travels of the cold water supply control valve 132 and the hot water supply control valve 131 of the hot and cold water adjustment unit 13 based on measurement values of the flowmeter 21, the mixed water path flowmeter 22, and the temperature sensors 23, and the assumed temperature and the assumed flow rate of mixed water which are desired by a user. The respective vale travels of the cold water supply control valve 132 and the hot water supply control valve 131 are controlled by, for example, feedback control.

The controller 18 performs control so as to switch between opening and closing of the valve of the water shut-off switch 15 based on the measurement values of the flowmeter 21, the mixed water path flowmeter 22, and the temperature sensors 23 or by operation by a user.

The temperature of hot water flowing through the hot water supply path 11 is substantially equal to the set temperature of the hot water supply 51. The temperature of cold water flowing through the cold water supply path 12 is an initial temperature (an ordinary temperature) corresponding to, for example, an outdoor air temperature. The hot water and the cold water are mixed with each other to provide mixed water.

Here, the hot and cold water mixing device 1 is to be mainly used in a bathroom, kitchen, washroom, etc. of a general household.

Thus, for example, in a case where the hot and cold water mixing device 1 is sent out to a region having a high average temperature, the set temperature of the hot water supply 51 is set within a low temperature range of about 50° C. to about 70° C. at a factory because the temperature of water in the region is high.

For example, in a case where the hot and cold water mixing device 1 is sent out to a region having a low average temperature, the set temperature of the hot water supply 51 is set within a high temperature range of about 80° C. to about 90° C. at a factory because the initial temperature of water in the region is low.

For the temperature of mixed water, an assumed temperature within a range is defined depending on the application of the mixed water. The assumed temperature is, for example, 43° C. to 45° C. for hot water to be filled in a bathtub in a bathroom and 40° C. to 43° C. for hot water of a shower in the bathroom.

The hot water supply assumed flow rate of the hot water flowing through the hot water supply path 11 and the cold water supply assumed flow rate of the cold water flowing through the cold water supply path 12 are determined based on the difference between the temperature of hot water and the temperature of cold water defined as described above and on the assumed temperature of mixed water.

When the difference between the set temperature of hot water and the set temperature of mixed water is small, a small volume of cold water suffices to cold the hot water.

Therefore, the hot water supply assumed flow rate increases, whereas the cold water supply assumed flow rate decreases. For example, when the set temperature of mixed water is 40° C. and the temperature of cold water is 20° C., if the set temperature of the hot water supply 51 is 50° C., a large volume of hot water is allowed to flow, and a small volume of cold water is allowed to flow.

When the difference between the set temperature of hot water and the set temperature of mixed water is large, a large volume of cold water is required to cool the hot water. Therefore, the hot water supply assumed flow rate decreases, whereas the cold water supply assumed flow rate increases. For example, when the set temperature of mixed water is 40° C. and the temperature of cold water is 20° C., if the set temperature of the hot water supply 51 is 90° C., a small volume of hot water is allowed to flow, and a large volume of cold water is allowed to flow.

As described above, a higher one of the hot water supply assumed flow rate and the cold water supply assumed flow rate is determined based on three temperatures, i.e., the set temperature of the hot water supply 51, the initial temperature of the cold water supply 52, and the set temperature of mixed water.

In the present embodiment, the flowmeter 21 is disposed in one of the flow paths which has a higher one of the hot water supply assumed flow rate and the cold water supply assumed flow rate, and the mixed water path flowmeter 22 is disposed in the mixed water path 14.

As the flowmeter 21 and the mixed water path flowmeter 22, commercially available, common sensors are accordingly used. Examples of the flowmeter 21 and the mixed water path flowmeter 22 may be, but are not limited to, impeller flowmeters, differential pressure type flowmeters, etc.

When the flow rate is close to the lower limit of the measurement range of the flowmeter 21 and the mixed water path flowmeter 22, the movement of flowing water decreases and it becomes difficult for the flowmeter 21 and the mixed water path flowmeter 22 to sense the flowing water, and therefore, the measurement accuracy of the flowmeter 21 and the mixed water path flowmeter 22 decreases.

Therefore, in the hot and cold water mixing device 1 of the present embodiment, the flowmeter 21 is disposed in one of the flow paths which has a higher one of the hot water supply assumed flow rate and the cold water supply assumed flow rate. The mixed water path flowmeter 22 configured to measure the flow rate of mixed water is disposed in the mixed water path 14 in which the flow rate of hot water and the flow rate of cold water are totaled.

The flow rate of one of the hot water supply path 11 and the cold water supply path 12 in which the flowmeter 21 is not disposed is determined by subtracting the measurement value of the flowmeter 21 disposed in a remaining of the hot water supply path 11 and the cold water supply path 12 from the measurement value of the mixed water path flowmeter 22.

In the hot and cold water mixing device 1, the respective valve travels of the cold water supply control valve 132 and the hot water supply control valve 131 are controlled based on the measurement value of the mixed water path flowmeter 22, the measurement value of the flowmeter 21 disposed in the hot water supply path 11 or the cold water supply path 12, and the adjusted flow rate set by a used. In this way, it is possible to provide mixed water having an adjusted temperature and an adjusted flow rate set by the user.

When it is not possible to determine which one of the hot water supply assumed flow rate and the cold water supply assumed flow rate is higher, flowmeters 21 may be disposed in both of the hot water supply path 11 and the cold water supply path 12. In this case, an actual measurement value of the flowmeter 21 in the hot water supply path 11 is compared with an actual measurement value of the flowmeter 21 in the cold water supply path 12. Then, control is performed based on the measurement value of the flowmeter 21 in one of the flow paths which has a higher flow rate than a remaining of the flow paths and on the measurement value of the mixed water path flowmeter 22.

Figure 2A:
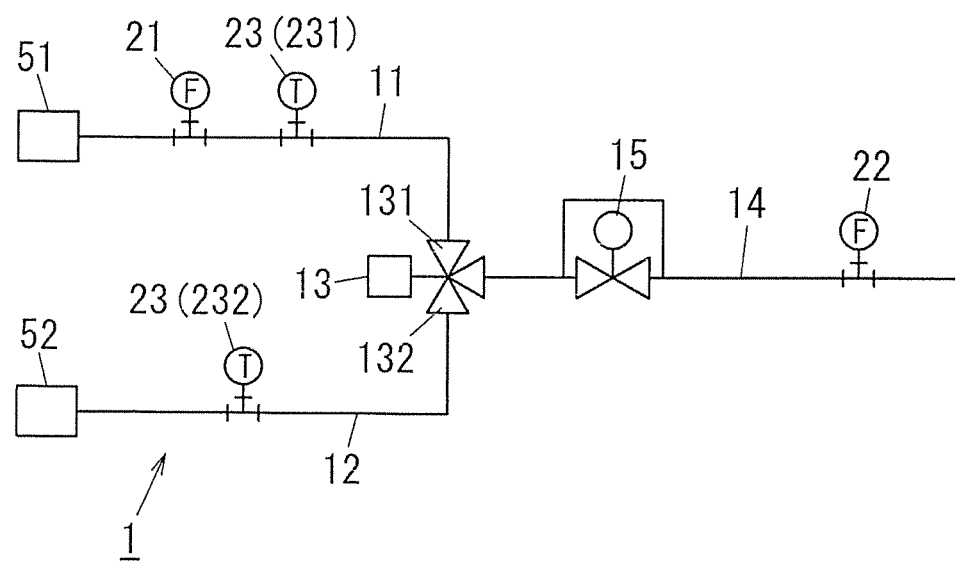
FIGS. 2A and 2B are conceptual views illustrating variations of the hot and cold water mixing device of the first embodiment.
Figure 2B:
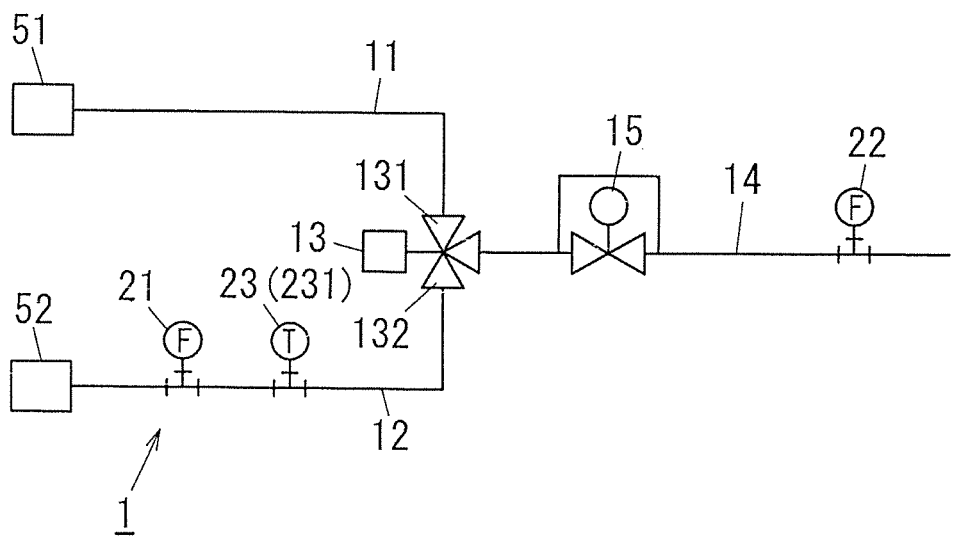

A description will be given of cases where in the hot and cold water mixing device 1 of the present embodiment, temperature sensors 23 are disposed in two of the hot water supply path 11, the cold water supply path 12, and the mixed water path 14 as illustrated in FIGS. 1 and 2. As the temperature sensors 23, commercially available, common sensors are accordingly used. The temperature sensors 23 may be, but are not limited to, thermistors.

Here, the hot and cold water mixing device 1 of the present embodiment includes a first temperature sensor 231, a second temperature sensor 232, and a third temperature sensor 233 which are the temperature sensors 23.

The number of the temperature sensors 23 is not limited to, but may be, two or more.

In the present embodiment, the first temperature sensor 231 is disposed in the hot water supply path 11, the second temperature sensor 232 is disposed in the cold water supply path 12, and the third temperature sensor 233 is disposed in the mixed water path 14.

First, the case where the temperature sensors 23 are disposed in one of the hot water supply path 11 and the cold water supply path 12 and in the mixed water path 14 will be described. In this case, based on the measurement value of the temperature sensor 23 in the mixed water path 14 and the adjusted temperature of mixed water, feedback control is performed to control the respective valve travels of the cold water supply control valve 132 and the hot water supply control valve 131. In this way, mixed water having the adjusted temperature can be obtained.

The temperature of the remaining one of the hot water supply path 11 and the cold water supply path 12 in which the temperature sensor 23 is not disposed is calculated based on the law of conservation of heat that the heat quantity is conserved even when hot water in the hot water supply path 11 and cold water in the cold water supply path 12 are mixed with each other to provide mixed water.

As an example, a case where the flowmeter 21 and the first temperature sensor 231 are disposed in the hot water supply path 11 and the flowmeter 21 and the second temperature sensor 232 are not disposed in the cold water supply path 12 as illustrated in FIG. 1 will be described. The mixed water path 14 is provided with the third temperature sensor 233 and the mixed water path flowmeter 22. Here, two sensors for measuring flow rates and two sensors for measuring temperatures are disposed in the hot and cold water mixing device 1.

Let V1 be the flow rate of the hot water supply path 11, V2 be the flow rate of the cold water supply path 12, V3 be the flow rate of the mixed water path 14, T1 be the temperature of the hot water supply path 11, T2 be the temperature of the cold water supply path 12, T3 be the temperature of the mixed water path 14, and c be the specific heat of water. In this case, the following equation holds true:

$$cV1(T1-T3)=cV2(T3-T2)$$

$$V3=V1+V2$$

The temperature of the cold water supply path 12 can be calculated as $$T2=(V1T1-V3T3)/V2$$

Next, a case where the first temperature sensor 231 is disposed in the hot water supply path 11 and the second temperature sensor 232 is disposed in the cold water supply path 12 as illustrated in FIG. 2A will be described. In this case, the mixed water path 14 is not provided with the third temperature sensor 233 but provided with only the mixed water path flowmeter 22. Here, two sensors for measuring flow rates and two sensors for measuring temperatures are disposed in the hot and cold water mixing device 1.

The temperature of mixed water is calculated from the law of conservation of heat. Here, the temperature of the mixed water path 14 can be calculated as $$T3=(V1T1+V2T2)/V3$$

Based on the calculated value of the temperature of the mixed water path 14, feedback control is performed to control the respective valve travels of the cold water supply control valve 132 and the hot water supply control valve 131.

Since the flowmeter 21 is disposed in the flow path having a high flow rate, the measurement value of the flowmeter 21 is highly accurate. Since the measurement value is used to calculate a value of the flow path having a low flow rate, the calculated value is also highly accurate. Thus, control of the respective valve travels of the cold water supply control valve 132 and the hot water supply control valve 131 is highly accurate. Therefore, stable temperature control can be performed.

In a case where the first temperature sensor 231 is disposed in the hot water supply path 11 and the second temperature sensor 232 is disposed in the cold water supply path 12, the temperature change gradients of the cold water supply path 12 and the hot water supply path 11 can be obtained. In the hot and cold water mixing device 1, the temperatures of the cold water supply path 12 and the hot water supply path 11 after the present time can be predicted based on the temperature change gradients.

Then, a predicted temperature of mixed water may be calculated from the predicted temperatures of the cold water supply path 12 and the hot water supply path 11, and the flow rates of the cold water supply path 12, the hot water supply path 11, and the mixed water path 14.

Based on the calculated predicted temperature, the temperature of the mixed water path 14 is controlled to be the adjusted temperature. In this way, the volumes of hot water and cold water can be adjusted in advance by the hot and cold water adjustment unit 13.

Therefore, even when the temperature of hot water or cold water changes, it is possible to reduce the magnitude of overshooting and undershooting the adjusted temperature of mixed water.

In the hot and cold water mixing device 1 of the first embodiment, the flow rate of the flow path having a high flow rate is measured by the flowmeter 21, thereby reducing degradation in the measurement accuracy of the flowmeter 21.

The flow rate of the flow path having a low flow rate is calculated by subtracting the measurement value of the flowmeter 21 disposed in the hot water supply path 11 or the cold water supply path 12 which has a higher flow rate than the remaining one of the hot water supply path 11 or the cold water supply path 12 from the measurement value of the mixed water path flowmeter 22. A low flow rate causes a low measurement accuracy of the flowmeter 21. The calculation can therefore provide a more accurate value that by the measurement of the flowmeter 21.

Even when the third temperature sensor 233 is not disposed in the mixed water path 14, the temperature of the mixed water path 14 can be highly accurately calculated from values of the flow rate and the temperature. Therefore, feedback control based on the calculated value of the temperature can control the temperature of mixed water as accurate as the feedback control in a case where the temperature sensor 23 is disposed in the mixed water path 14.

An example in which the hot and cold water mixing device 1 having the above-described configuration is attached to a water discharging device 3 installed in a bathroom and including a tap and a shower will be described below.

Figure 3:
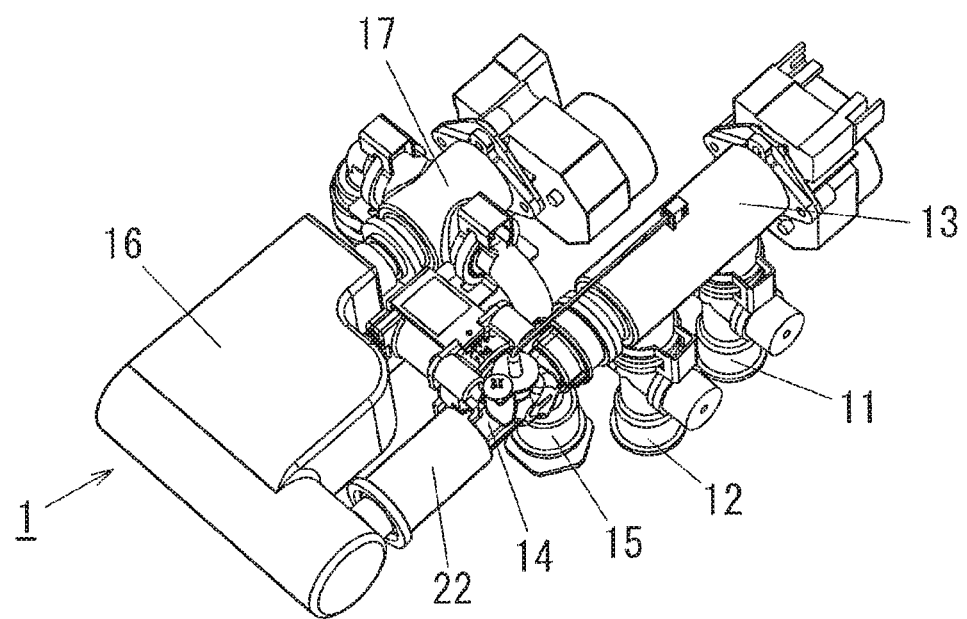
FIG. 3 is a perspective view illustrating the hot and cold water mixing device of the first embodiment.

As illustrated in FIG. 3, the hot and cold water mixing device 1 includes the cold water supply path 12 and the hot water supply path 11, the hot and cold water adjustment unit 13, the water shut-off switch 15, the mixed water path 14, a buffer tank 16, and a flow path switch 17 in this order from an upstream side.

The buffer tank 16 temporarily stores mixed water flowing from the hot and cold water adjustment unit 13. In this way, even when the temperature of cold water in the cold water supply path 12 and the temperature of hot water in the hot water supply path 11 suddenly change, it is possible to reduce changes in the temperature of mixed water discharged from the tap or the shower.

The flow path switch 17 switches between the shower and the tap. The flow path switch 17 includes a commercially available, common electrically operated valve.

Figure 4:
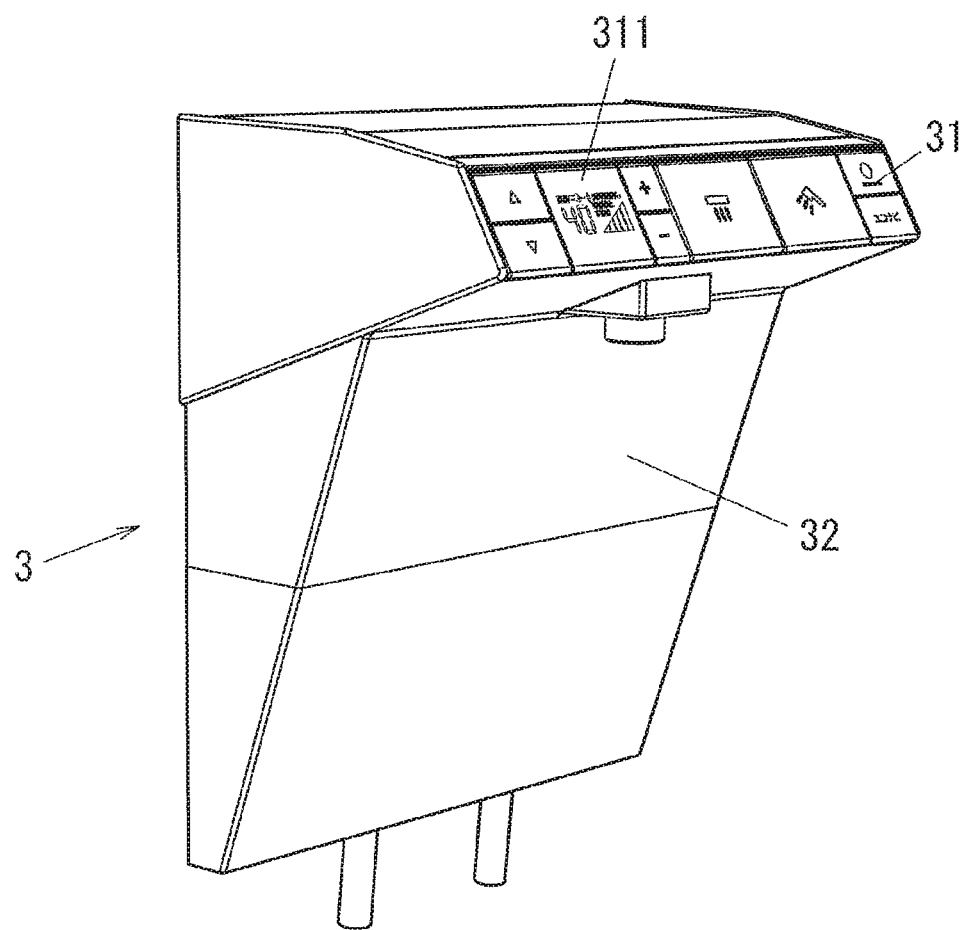
FIG. 4 is a perspective view illustrating a water discharging device of the first embodiment.

As illustrated in FIG. 4, the water discharging device 3 includes a front surface provided with an operation section 31 to specify the adjusted temperature and the adjusted flow rate of mixed water and a decorative case 32 covering the water discharging device 3 except for the operation section 31.

The operation section 31 includes a display section 311 configured to display a set temperature and to display from which of the tap and the shower water is to be discharged.

Figure 5:
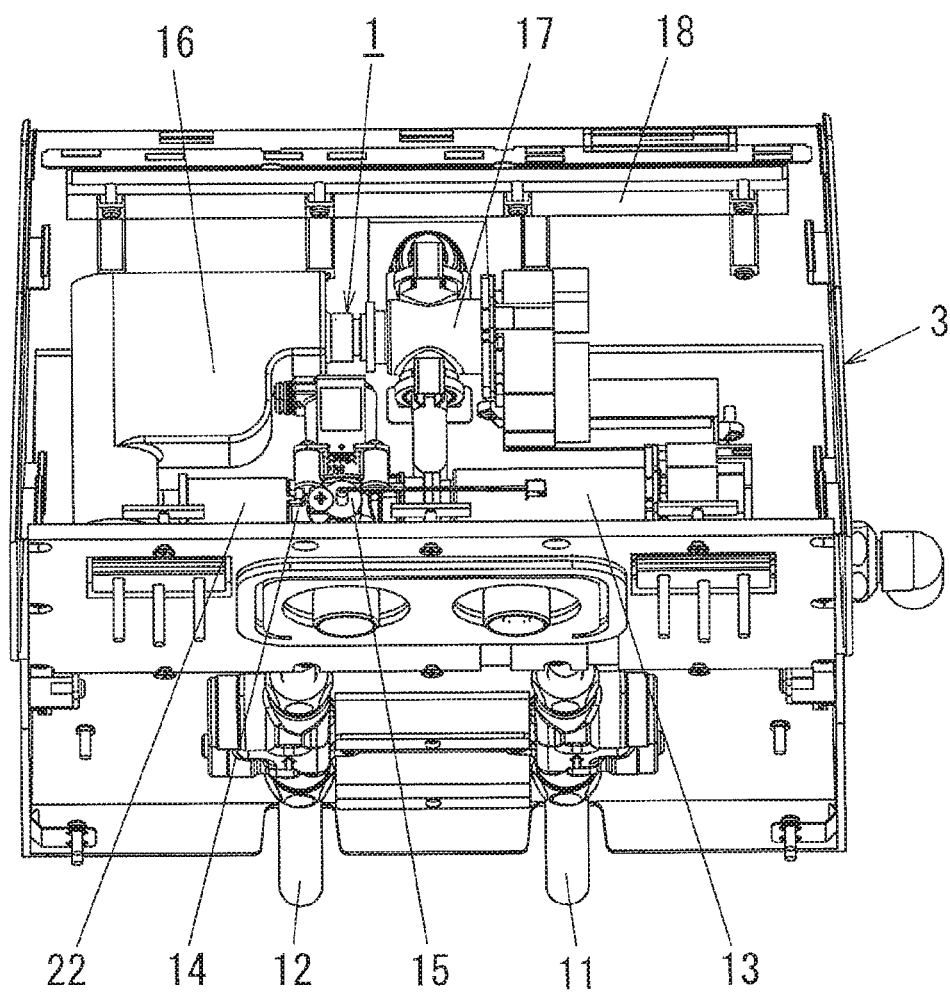
FIG. 5 is a plan view illustrating the water discharging device in which the hot and cold water mixing device of the first embodiment is installed, wherein an upper cover of the water discharging device is removed.

As illustrated in FIG. 5, the water discharging device 3 includes a controller 18 disposed on a rear side of the operation section 31.

The water discharging device 3 preferably has a double-cover structure in which a housing case housing the hot and cold water mixing device 1 and the controller 18 is covered with the decorative case 32.

The water discharging device 3 has an upper end portion in which the hot and cold water mixing device 1 is disposed. The hot water supply path 11 is connected to a hot water supply pipe, the cold water supply path 12 is connected to a cold water supply pipe, and the flow path switch 17 disposed in the mixed water path 14 is connected to the tap and the shower.

The hot and cold water adjustment unit 13, the water shut-off switch 15, the flow path switch 17, the flowmeter 21, the mixed water path flowmeter 22, and the temperature sensor 23 are electrically connected to the controller 18.

Second Embodiment

Figure 6:
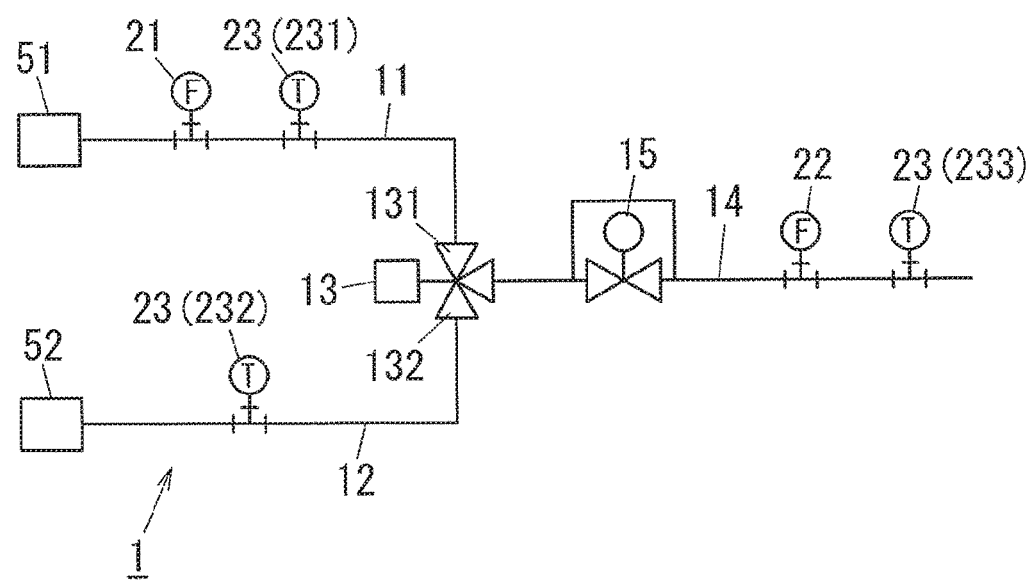
FIG. 6 is a conceptual view illustrating a hot and cold water mixing device of a second embodiment.

A hot and cold water mixing device 1 of the present embodiment will be described with reference to FIG. 6.

The hot and cold water mixing device 1 of the present embodiment is a variation of the hot and cold water mixing device 1 of the first embodiment and is featured by the arrangement of temperature sensors 23 in the hot and cold water mixing device 1.

A description will be given of a case where in the hot and cold water mixing device 1 of the present embodiment, a first temperature sensor 231 is disposed in a hot water supply path 11, a second temperature sensor 232 is disposed in a cold water supply path 12, and a third temperature sensor 233 is disposed in a mixed water path 14. Here, two sensors for measuring flow rates and three sensors for measuring temperatures are disposed in the hot and cold water mixing device 1.

Here, based on a measurement value of the third temperature sensor 233 in the mixed water path 14, feedback control is performed to control respective valve travels of a cold water supply control valve 132 and a hot water supply control valve 131 so as to adjust the temperature of mixed water to a desired temperature.

In the hot and cold water mixing device 1, the first temperature sensor 231 is disposed in the hot water supply path 11, and the second temperature sensor 232 is disposed in the cold water supply path 12. Therefore, in the hot and cold water mixing device 1, it is possible to predict the temperature of the cold water supply path 12 and the temperature of the hot water supply path 11 after the present time respectively from the temperature change gradient of the cold water supply path 12 and the temperature change gradient of the hot water supply path 11.

In the hot and cold water mixing device 1 having the above-described configuration, feedback control based on a measurement value of the third temperature sensor 233 of the mixed water path 14 is combined with feedforward control based on the predicted temperatures of the hot water supply path 11 and the cold water supply path 12.

In the hot and cold water mixing device 1 of the second embodiment, it is possible to further reduce the magnitude of overshooting and undershooting the adjusted temperature of mixed water as comparted to the case where only feedback control is performed based on the measurement value of the temperature sensor 23 of the mixed water path 14.

Third Embodiment

A water discharging device in a bathroom usually includes a hot and cold water mixing device and is also capable of switching between a tap and a shower to discharge water.

However, when a user uses mixed water discharged from a water outlet port, the user tends to leave the mixed water running.

Therefore, in terms of discharging mixed water from the tap, the water discharging device measures a water discharge time or a water discharge rate to obtain a measured value, and the water discharging device performs volumetric water discharge in which discharging water is stopped when the measured value reaches a predetermined value. In terms of discharging mixed water from the tap, the water discharging device also performs continuous water discharge in which water is continuously discharged from the tap until water stop operation is performed.

A water discharging device capable of switching between the volumetric water discharge and the continuous water discharge is disclosed in Document 2 (JP H06-8488 U).

The water discharging device of Document 2 senses the orientation of a horizontally rotatable tap and switches between the volumetric water discharge and the continuous water discharge based on the sensed orientation. The water discharging device performs the volumetric water discharge when the water outlet port is oriented toward a bath tub side, whereas the water discharging device performs the continuous water discharge when the water outlet port is oriented toward a washing place side.

There is a case where a user wishes the volumetric water discharge also on the washing place side, for example, to fill a wash bowl with mixed water on the washing place side. However, the above-described device could not satisfy this wish. Of course, the wish can be satisfied by allowing the volumetric water discharge as necessary also when water is discharged on the washing place side.

However, when mixed water stored in the wash bowl is used for washing faces, the mixed water having a low temperature is generally used. Therefore, for washing faces, temperature adjustment operation of the mixed water is also required in addition to switching between the continuous water discharge and the volumetric water discharge. This complicates water discharge operation.

In view of the above problems, an object of the water discharging device of the present embodiment is to simplify the water discharge operation when mixed water discharged from the water outlet port is used for washing faces.

A water discharging device 3 including a hot and cold water mixing device 1 of the present embodiment will be described with reference to FIGS. 7 and 8.

The hot and cold water mixing device 1 of the present embodiment is a variation of the hot and cold water mixing device 1 of the first embodiment and the second embodiment and is featured by temperature control of water discharged from a tap 41 and a shower 42 by a controller 18A.

The hot and cold water mixing device 1 is disposed in an electronically controlled water discharging device of the hot and cold water mixing type described above. In the water discharging device 3, a mixed water path 14 of the hot and cold water mixing device 1 is connected to the tap 41 and the shower 42 via a flow path switch 17.

Water shut-off valves 33, check valves 34, and drain plugs 36 which are manually openable and closeable are provided in a hot water supply path 11 and a cold water supply path 12.

A pipe directly connecting the water shut-off valve 33 provided in the cold water supply path 12 to the shower 42 is used to discharge water in an emergency in case of a power outage and has a manually openable and closeable water shut-off valve 33 provided therein.

The flow path switch 17 configured to switch between the flow path to the tap 41 and the flow path to the shower 42 is provided in the mixed water path 14. Between the flow path switch 17 and the shower 42, a high cut valve 35 configured to inhibit the passage of mixed water having a temperature higher than an initial temperature is provided.

The mixed water path 14 is provided with a water shut-off switch 15 and a mixed water path flowmeter 22.

Figure 7:
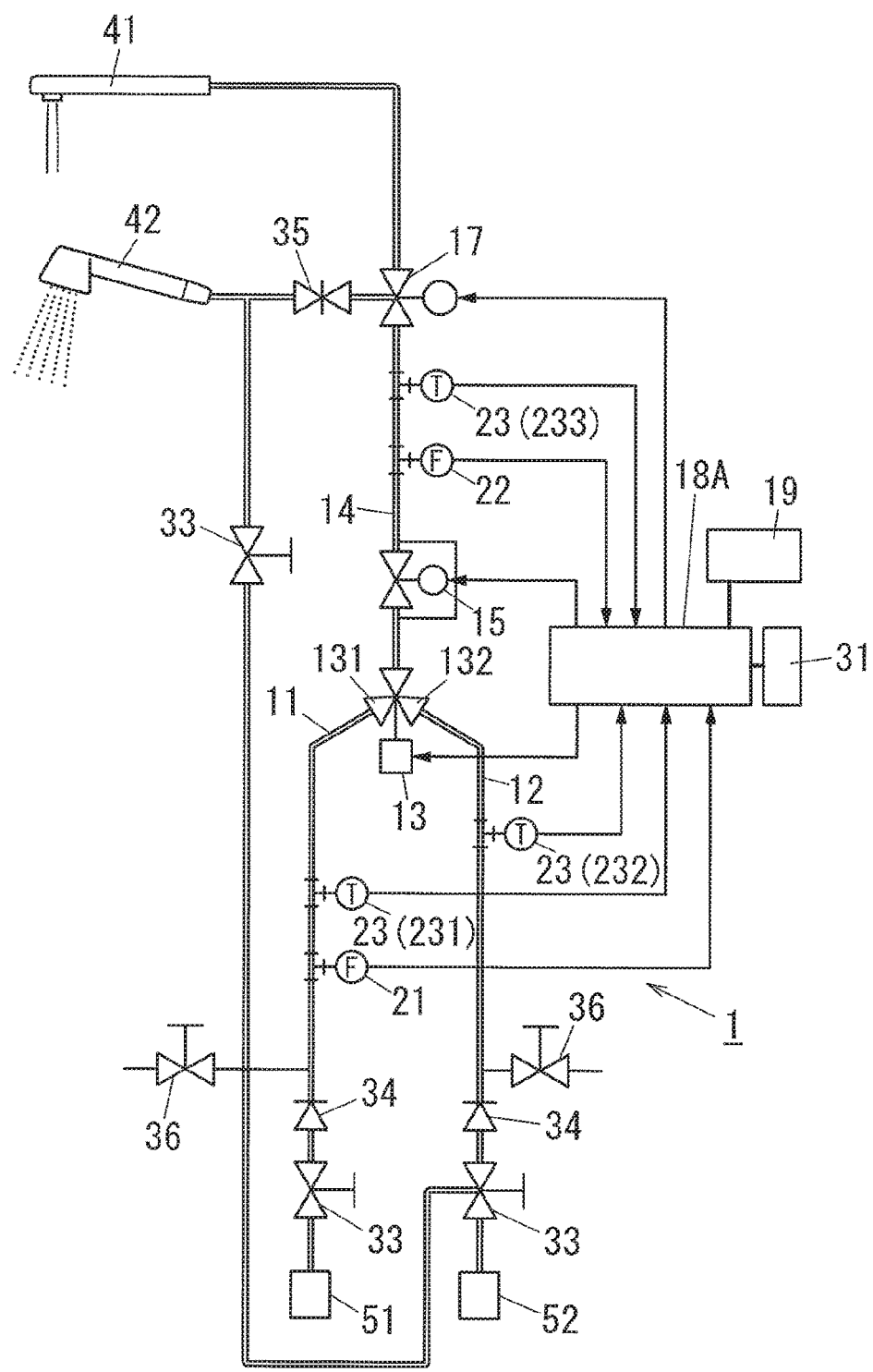
FIG. 7 is a block diagram illustrating a water discharging device in which a hot and cold water mixing device of a third embodiment is installed.

In the present embodiment, as illustrated in FIG. 7, a flowmeter 21 is provided in the hot water supply path 11 but may be provided in the cold water supply path 12. In particular, the flowmeter 21 is disposed in a flow path having a high flow rate.

In the present embodiment, a temperature sensor 23 is provided in each of the hot water supply path 11, the cold water supply path 12, and the mixed water path 14 as illustrated in FIG. 7, but the temperature sensors 23 may be provided to at least two of the hot water supply path 11, the cold water supply path 12, and the mixed water path 14.

Here, the controller 18A controls operation of each of the hot and cold water adjustment unit 13, the water shut-off switch 15, and the flow path switch 17.

As illustrated in FIG. 7, the controller 18A is electrically connected to a first temperature sensor 231 configured to measure the temperature of hot water flowing through the hot water supply path 11 and a second temperature sensor 232 configured to measure the temperature of cold water flowing through the cold water supply path 12. The controller 18A is further electrically connected to a third temperature sensor 233 configured to measure the temperature of mixed water flowing through the mixed water path 14.

Therefore, the controller 18A can recognize the temperature of cold water supplied through the cold water supply path 12, the temperature of hot water supplied through the hot water supply path 11, and the temperature of mixed water discharged through the mixed water path 14.

The controller 18A is further electrically connected to the flowmeter 21 configured to measure the flow rate of cold water or hot water flowing through one of the hot water supply path 11 and the cold water supply path 12 and to the mixed water path flowmeter 22 configured to measure the flow rate of mixed water which is to be discharged.

Therefore, the controller 18A can recognize the flow rate of cold water supplied through the cold water supply path 12, the flow rate of hot water supplied through the hot water supply path 11, and the flow rate of mixed water discharged through the mixed water path 14.

The controller 18A is electrically connected to a power supply circuit 19 and an operation section 31 including a display section 311 configured to display the set temperature of mixed water and to display from which one of the tap 41 and the shower 42 water is to be discharged.

In this water discharging device 3, when water discharge operation is performed on the operation section 31, mixed water having a temperature selected by the operation section 31 is discharged from the tap 41 or the shower 42 selected by the operation section 31. Here, the controller 18A opens the valve of the water shut-off switch 15 to start discharging mixed water and switches the flow path switch 17 based on the selection made as to which one of the tap 41 and the shower 42 the mixed water is to be discharged.

The controller 18A also controls the hot and cold water adjustment unit 13 based on measured values of the first temperature sensor 231 in the hot water supply path 11 and the second temperature sensor 232 in the cold water supply path 12 to adjust the flow rate of cold water and the flow rate of hot water. In this way, the controller 18A provides mixed water having a temperature set by the operation section 31. Then, the controller 18A performs feedback control of the temperature of the mixed water from the measured value of the temperature sensor 23 in the mixed water path 14.

When water stop operation is performed on the operation section 31, the controller 18A closes the water shut-off switch 15 to stop water.

When a user instructs continuous water discharge from the tap 41 by the operation section 31, opening and closing of the water shut-off switch 15 are performed by the user. The continuous water discharge means that water is continuously discharged until the water stop operation is performed by a user.

When a user instructs volumetric water discharge from the tap 41 by the operation section 31, the controller 18A controls opening and closing of the water shut-off switch 15. The controller 18A measures the volume of mixed water to be discharged by using the mixed water path flowmeter 22 and closes the water shut-off switch 15 when the measured value reaches a predetermined volume (for example, a volume which can fill the wash bowl).

In the volumetric water discharge, the controller 18A performs control by measuring the flow rate but not a time period during which the water shut-off switch 15 is open. Therefore, when a preset volume is three liters, water is stopped at the time when three liters of water are discharged even in an environment in which the water pressure differs.

When the shower 42 is used, or when mixed water from the tap 41 is used for washing bodies, the mixed water is used at about 40° C. In contrast, when mixed water filled in the wash bowl is used for washing faces, the mixed water is used at 32° C. to 34° C., which is slightly lower than the body temperature.

Therefore, in the water discharging device 3 of the present embodiment, when the volumetric water discharge from the tap 41 is instructed, the volumetric water discharge of mixed water having a predetermined temperature TS (for example, 32° C. to 34° C. described above) is performed even when the temperature of the mixed water set by the operation section 31 exceeds the predetermined temperature TS.

Figure 8:
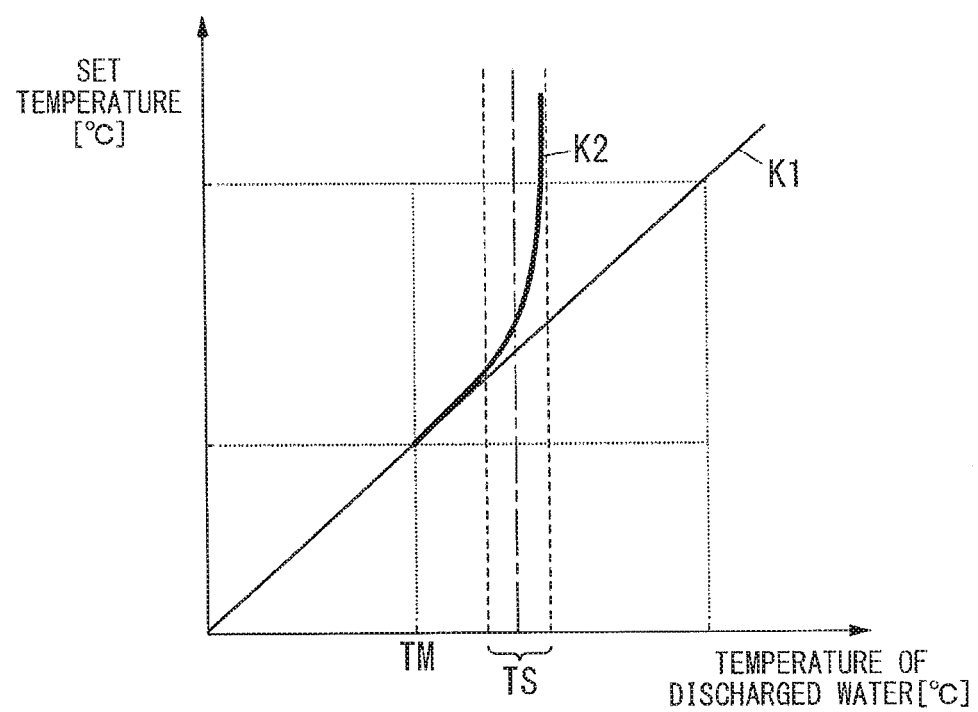
FIG. 8 is a view illustrating hot water temperature characteristics of the water discharging device in which the hot and cold water mixing device of the third embodiment is installed.

In this way, when the continuous water discharge is performed, the controller 18A controls the hot and cold water adjustment unit 13, and therefore, the temperature of mixed water discharged from the water discharging device 3 becomes a temperature corresponding to a set temperature instructed by the operation section 31 as represented by K1 in FIG. 8.

Here, FIG. 8 will be described. In FIG. 8, the abscissa denotes the temperature of mixed water measured by the temperature sensor 23, and the ordinate denotes the set temperature of the mixed water set by a user by the operation section 31.

However, when the volumetric water discharge is performed, the controller 18A controls the hot and cold water adjustment unit 13 in the water discharging device 3 so that the temperature of mixed water discharged from the tap 41 does not exceed the predetermined temperature TS. The temperature of mixed water in this case is represented by K2 in FIG. 8.

When the set temperature is lower than the predetermined temperature TS, mixed water at the set temperature is discharged, whereas when the set temperature is higher than the predetermined temperature TS, the temperature of the mixed water to be discharged is limited to the predetermined temperature TS. Note that the predetermined temperature TS may be a constant temperature or may be a temperature within a certain range.

Here, TM in FIG. 8 denotes a settable minimum temperature.

Any form of the operation section 31 may be used to give instructions to set the temperature of mixed water, to select from which apparatus (the tap 41 or the shower 42) the mixed water is to be discharged, and to select the continuous water discharge or the volumetric water discharge.

For example, the operation section 31 may be provided with three sections individually, i.e., a temperature setting section, a discharge destination selecting section, and continuous water discharge volumetric water discharge selecting section of mixed water. Alternatively, for example, the operation section 31 may include an instruction section exclusively for the volumetric water discharge from the tap 41 in addition to a temperature setting section and a discharge destination selecting section of mixed water.

Additionally, the volumetric water discharge of mixed water according to the set temperature may be performed, or the volumetric water discharge from the shower 42 may also be performed.

When the water discharging device 3 including the hot and cold water mixing device 1 of the third embodiment performs the volumetric water discharge, mixed water is not left running, and therefore, waste of mixed water can be eliminated.

Moreover, when the volumetric water discharge is performed, the temperature of mixed water is restricted to or under the predetermined temperature TS. Therefore, mixed water for washing faces which preferably has a temperature lower than the temperature of normally used mixed water can be obtained without further performing temperature adjustment operation. This simplifies water discharge operation at the time of washing faces.

Fourth Embodiment

In a water discharging device, the discharge rate is generally adjusted by manually adjusting a ratio of valve opening of a water shut-off switch. However, in this case, it takes time to adjust the discharge flow rate per unit time to a flow rate desired by a user. In addition, in many cases, more water is discharged than is needed. This may lead to disadvantages in terms of saving water.

Here, the water shut-off switch is configured such that the flow rate per unit time is adjustable by an electric motor and the water shut-off switch is further provided with an electrically driven flow rate control valve. This configuration allows a ratio of valve opening of the electrically driven flow rate control valve to be set to a preset ratio of valve opening in a single operation, thereby reducing the disadvantages.

However, the feed water pressure of city water supplied to the water discharging device varies depending on regions, usage environment, etc., and due to the variation in feed water pressure, the actual discharge rate also varies.

Document 3 (JP 2010-229765 A) describes a water discharging device including a flowmeter to measure a flow rate and to perform feedback control of flow rate adjustment based on the measured flow rate so as to reduce the influence of the variation in feed water pressure. However, in such a configuration, the discharge rate from a water discharging device 3 cannot be maximized.

In view of the above problems, an object of a water discharging device including a hot and cold water mixing device of the present embodiment is to facilitate adjustment of the discharge rate and to save water.

Figure 9:
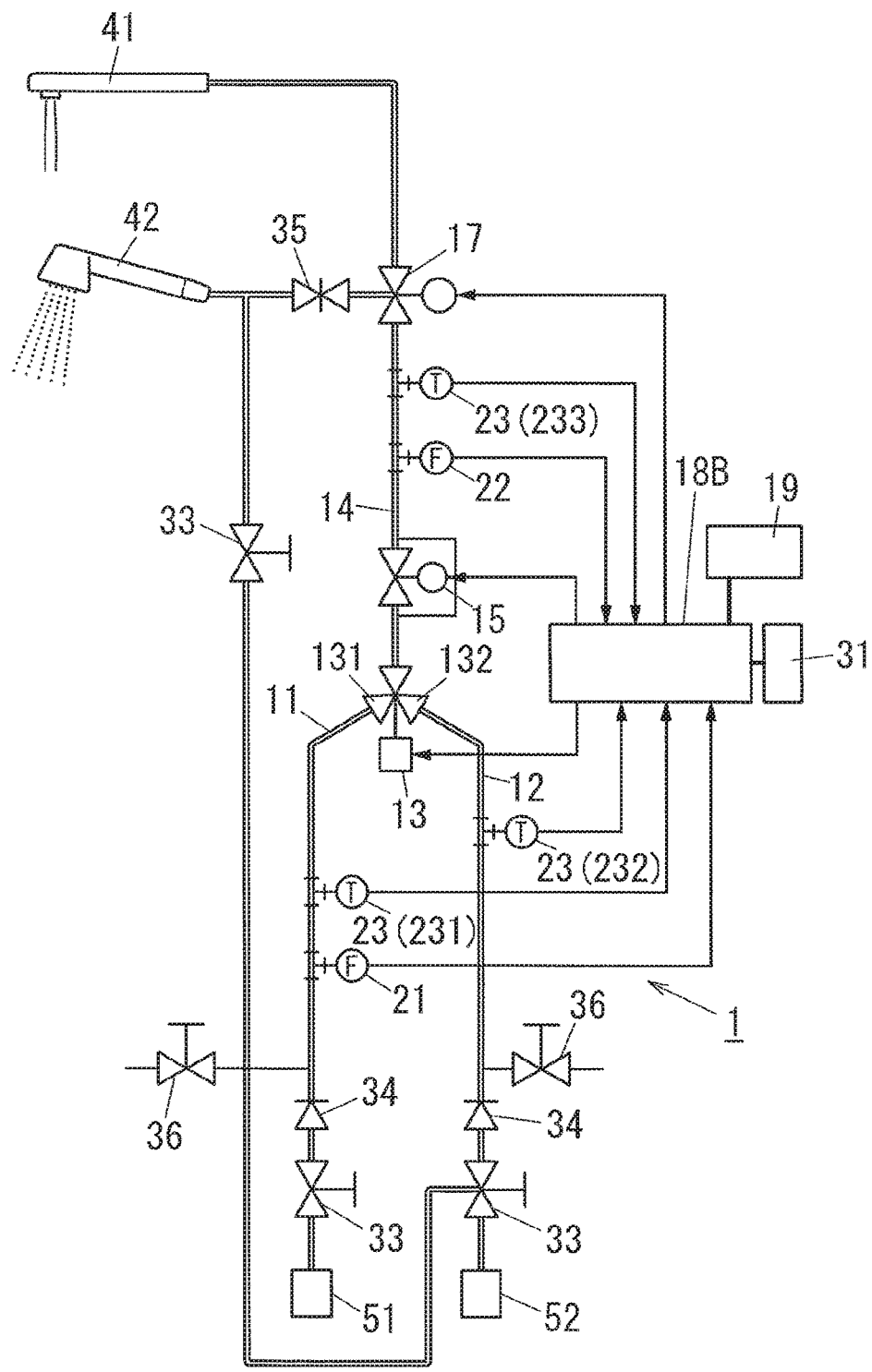
FIG. 9 is a block diagram illustrating a water discharging device in which a hot and cold water mixing device of a fourth embodiment is installed.

A water discharging device 3 including a hot and cold water mixing device 1 of the present embodiment will be described with reference to FIGS. 9 to 11.

The hot and cold water mixing device 1 of the present embodiment is a variation of the hot and cold water mixing device 1 of the first embodiment to the third embodiment and is featured by control of the discharge rate from a tap 41 and a shower 42 by a controller 18B.

In the water discharging device 3 of the present embodiment, when the discharge rate is adjusted to the flow rate selected by the operation section 31, the controller 18B performs the following two types of modes according to instructions by a user.

One is a normal water discharge mode in which a hot and cold water adjustment unit 13 is adjusted to have an opening preset in accordance with a flow rate level set by the operation section 31 so as to discharge water. The other is a measured water discharge mode in which the flow rate per unit time preset in accordance with the flow rate level set by the operation section 31 is adjusted so as to discharge water.

These two modes are switchable by being selected by a user by the operation section 31.

The latter measured water discharge mode is a mode in which the discharge rate per unit time is measured by a mixed water path flowmeter 22 to perform feedback control of the hot and cold water adjustment unit 13.

Figure 10:
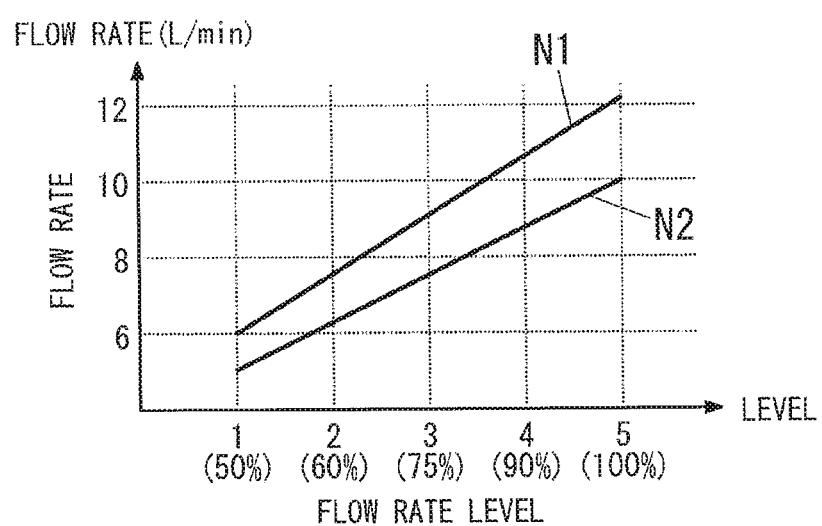
FIG. 10 is a view illustrating flow rate characteristics per unit time of measured water discharge and normal water discharge of the water discharging device in which the hot and cold water mixing device of the fourth embodiment is installed.

In the measured water discharge mode, the actual flow rate per unit time is set to be lower, as illustrated in FIG. 10, than in the normal water discharge mode.

Here, FIG. 10 will be described. In FIG. 10, the abscissa denotes the flow rate setting level by the operation section 31, and the ordinate denotes the actual flow rate per unit time.

As illustrated in FIG. 10, the actual flow rate of mixed water with respect to the flow rate setting by the water discharging device 3 of the present embodiment is represented by N1 in the figure in the normal water discharge mode. In contrast, in the measured water discharge mode, the controller 18B controls the flow rate of mixed water to achieve a flow rate represented by N2 in the figure, thereby saving about 20% water.

Note that the flow rate per unit time in the normal water discharge mode varies depending on the feed water pressure.

When the measured water discharge mode is set and the shower 42 is selected as a discharge destination in the water discharging device 3, the controller 18B controls the hot and cold water adjustment unit 13 so as not to exceed a preset flow rate per unit time.

Figure 11:
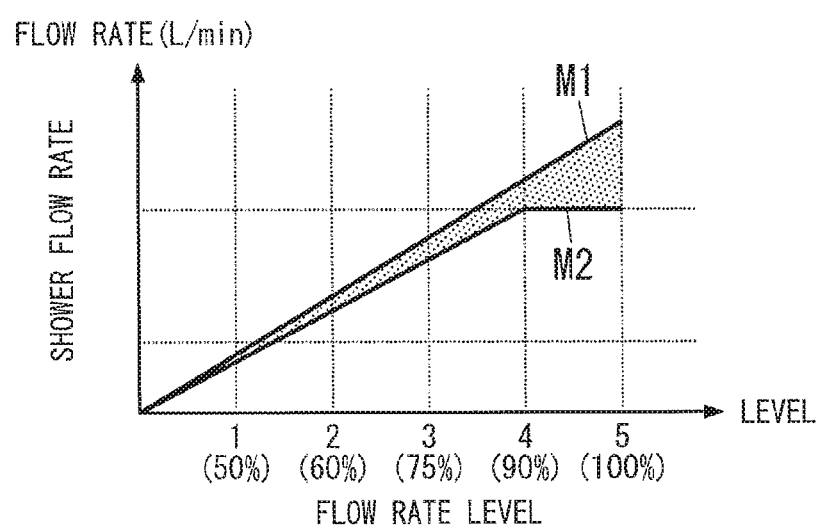
FIG. 11 is a view illustrating flow rate characteristics per unit time of water discharged from a shower of the water discharging device in which the hot and cold water mixing device of the fourth embodiment is installed.

In the normal water discharge mode, as represented by M1 in FIG. 11, the flow rate level is changed, and as the ratio of valve opening of the hot and cold water adjustment unit 13 increases, the flow rate per unit time of mixed water increases.

Here, FIG. 11 will be described. In FIG. 11, the abscissa denotes the flow rate setting level of the operation section 31, and the ordinate denotes the actual flow rate per unit time of the shower.

However, in the measured water discharge mode, as represented by M2 in FIG. 11, water is saved as described above, and the controller 18B controls the flow rate of mixed water so that the flow rate per unit time does not exceed a predetermined flow rate (for example, 8 liters/min).

In this way, a comfortable water rate as the water rate per unit time at the time of taking the shower 42 can be maintained regardless of the feed water pressure, and at the same time, water can be saved.

A flow rate restriction in which the flow rate per unit time is restricted so as not to exceed a predetermined flow rate can be applied not only to a case where water is discharged from the shower 42 but also to a case where water is discharged from the tap 41. Different flow rate restriction values may be set for the discharge from the shower 42 and the discharge from the tap 41.

Moreover, the water saving rate of the measured water discharge mode with respect to the normal water discharge mode may differ between the discharge from the shower 42 and the discharge from the tap 41. When discharge destinations other than the shower 42 and the tap 41 which are switchable by the flow path switch 17 exist, the same applies to these discharge destinations.

In the water discharging device 3, when water is discharged in the measured water discharge mode, a time lag exists between a start of discharging water and an output of a flow rate measured value from the mixed water path flowmeter 22. Therefore, the controller 18B of the water discharging device 3 of the present embodiment sets the opening area of the hot and cold water adjustment unit 13 as described below to start discharging water in the measured water discharge mode.

First, a value which is obtained by performing feedback control of the flow rate to discharge water in the measured water discharge mode and which corresponds to the opening area of the hot and cold water adjustment unit 13 with respect to the flow rate level set by the operation section 31 is stored.

Then, in the next measured water discharge mode, water starts to be discharged with the opening area of the hot and cold water adjustment unit 13 being set to the stored value. Thereafter, the process proceeds to feedback control from the mixed water path flowmeter 22.

Therefore, water discharge is started at a flow rate per unit time substantially corresponding to the flow rate level set by the operation section 31.

The water discharging device 3 including the hot and cold water mixing device 1 of the first embodiment can increase the discharge flow rate per unit time to a maximum water rate according to the feed water pressure in the normal water discharge mode.

Moreover, the water discharging device 3 can discharge water at a flow rate per unit time desired by a used regardless of the variation in feed water pressure in the measured water discharge mode in a simple manner, and can also save water.

As can be seen from the embodiments described above, the hot and cold water mixing device 1 according to a first aspect of the present invention includes the hot water supply path 11 which is connected to the hot water supply 51 and which allows hot water having a set temperature set by the hot water supply 51 to flow through and the cold water supply path 12 which allows cold water to flow through. The hot and cold water mixing device 1 includes the hot and cold water adjustment unit 13 configured to mix hot water flowing through the hot water supply path 11 and cold water flowing through the cold water supply path 12 with each other to provide mixed water having an adjusted temperature and an adjusted flow rate. The hot and cold water mixing device 1 includes the mixed water path 14 which is connected to the hot and cold water adjustment unit 13 and which allows mixed water to flow through, the water shut-off switch 15 configured to switch between stopping and passing of mixed water, and the mixed water path flowmeter 22 which is disposed in the mixed water path 14 and configured to measure the flow rate of mixed water. The hot and cold water mixing device 1 includes the flowmeter 21 disposed in one of the hot water supply path 11 and the cold water supply path 12 which has a higher flow rate than the remaining one of the hot water supply path 11 and the cold water supply path 12, the flowmeter 21 being configured to measure a corresponding flow rate of the flow rate of hot water in the hot water supply path 11 or the flow rate of cold water in the cold water supply path 12. The hot and cold water mixing device 1 includes at least the first temperature sensor 231 and the second temperature sensor 232 which are individually disposed at least two of the hot water supply path 11, the cold water supply path 12, and the mixed water path 14. The hot and cold water adjustment unit 13 adjusts the mixing volume of hot water and cold water based on measurement values of the flowmeter 21 disposed in one of the hot water supply path 11 and the cold water supply path 12 which has a higher flow rate than the remaining one of the hot water supply path 11 and the cold water supply path 12, the mixed water path flowmeter 22, and at least the first temperature sensor 231 and the second temperature sensor 232.

According to the first aspect, the flow rate of the flow path having a high flow rate is measured by the flowmeter 21, and therefore, it is possible to reduce degradation in the measurement accuracy of the flowmeter 21. Thus, stable temperature control is possible.

The hot and cold water mixing device 1 according to the first aspect of the present invention preferably includes the following features. In the hot and cold water mixing device 1, the flowmeter 21 is disposed in one of the flow paths which has a higher one of the hot water supply assumed flow rate and the cold water supply assumed flow rate determined by the set temperature of the hot water supply 51 and the initial temperature of the cold water supply 52.

With this configuration, it is possible to determine which one of the hot water supply path 11 and the cold water supply path 12 has a higher flow rate than the remaining one of the hot water supply path 11 and the cold water supply path 12 without disposing flowmeters 21 both in the hot water supply path 11 and the cold water supply path 12.

Moreover, the hot and cold water mixing device 1 according to the first aspect of the present invention preferably includes the following features. In the hot and cold water mixing device 1, the first temperature sensor 231 is disposed in the hot water supply path 11, and the second temperature sensor 232 is disposed in the cold water supply path 12.

With this configuration, the temperatures of the cold water supply path 12 and the hot water supply path 11 after the present time can be predicted based on the temperature change gradients of the cold water supply path 12 and the hot water supply path 11 respectively. Thus, even when the temperature of cold water or hot water changes, it is possible to reduce the magnitude of overshooting and undershooting the adjusted temperature of mixed water.

Moreover, in the hot and cold water mixing device 1 according to a second aspect of the present invention, the first temperature sensor 231 is disposed in the hot water supply path 11, the second temperature sensor 232 is disposed in the cold water supply path 12, and the third temperature sensor 233 is disposed in the mixed water path 14.

According to the second aspect, the feedback control based on the measurement value of the third temperature sensor 233 in the mixed water path 14 can be combined with the feedforward control based on the predicted temperatures of the cold water supply path 12 and the hot water supply path 11.

Therefore, it is possible to further reduce the magnitude of overshooting and undershooting the adjusted temperature of mixed water as compared to the case where only the feedback control based on the measurement value of the third temperature sensor 233 in the mixed water path 14 is performed.

The water discharging device 3 including the hot and cold water mixing device 1 according to a third aspect of the present invention mixes supplied cold water and supplied hot water to provide mixed water having a temperature according to the set temperature, and discharges the mixed water from selected one of the discharge destinations, the water outlet port or the shower 42. The water discharging device 3 includes the water shut-off switch 15 configured to discharge and to stop water, the hot and cold water adjustment unit 13 configured to adjust the mixing ratio of cold water and hot water, and the mixed water path flowmeter 22 configured to measure the flow rate of mixed water obtained by mixing the cold water and the hot water. The water discharging device 3 further includes the operation section 31 to give instructions to discharge and to stop mixed water, to set the temperature of the mixed water, and to select a discharge destination of the mixed water. The water discharging device 3 includes the controller 18A configured to control the hot and cold water adjustment unit 13 based on the temperature of mixed water set by the operation section 31 and to switch the flow path to the discharge destination selected by the operation section 31. The controller 18A includes two modes, i.e., a continuous water discharge mode in which discharging of water is stopped in response to a stop instruction from the operation section 31 and a volumetric water discharge mode in which discharging of water is stopped at the time at which the flow rate measured by the mixed water path flowmeter 22 reaches a predetermined rate. The controller 18A restricts the temperature of mixed water to be discharged to the predetermined temperature TS when the temperature of the mixed water set by the operation section 31 is higher than the predetermined temperature TS in the volumetric water discharge mode.

According to the third aspect, it is possible to simplify water discharge operation in the case where mixed water discharged from the water outlet port is used for washing faces.

Moreover, the water discharging device 3 including the hot and cold water mixing device 1 according to a fourth aspect of the present invention includes the mixed water path flowmeter 22 configured to measure the discharge flow rate and the hot and cold water adjustment unit 13 configured to adjust the discharge flow rate. The water discharging device 3 further includes the controller 18B configured to control the hot and cold water adjustment unit 13 so as to achieve a flow rate per unit time specified by the operation section 31. The water discharging device 3 further has a normal water discharge mode in which the hot and cold water adjustment unit 13 is adjusted to have a ration of valve opening preset in accordance with the flow rate level set by the operation section 31 so as to discharge water. The water discharging device 3 further has a measured water discharge mode in which the hot and cold water adjustment unit 13 is adjusted to achieve a flow rate per unit time preset in accordance with the flow rate level set by the operation section 31 so as to discharge water. The controller 18B is capable of switching between the normal water discharge mode and the measured water discharge mode. In the measured water discharge mode, the flow rate per unit time measured by the mixed water path flowmeter 22 is fed back to adjust the discharge rate. In the water discharging device 3, in the measured water discharge mode, the actual discharge flow rate per unit time with respect to the flow rate level set by the operation section 31 is lower than in the normal water discharge mode.

According to the fourth aspect, the discharge rate can be easily adjusted, and water can be saved.

The water discharging device 3 including the hot and cold water mixing device 1 according to the fourth aspect of the present invention preferably has the following features. The controller 18B restricts the flow rate per unit time to be lower than or equal to a preset flow rate in the measured water discharge mode.

With this configuration, a comfortable water rate can be maintained regardless of the feed water pressure, and water can be saved.

Moreover, the water discharging device 3 including the hot and cold water mixing device 1 according to the fourth aspect of the present invention preferably has the following features. The controller 18B stores a value according to the opening area of the hot and cold water adjustment unit 13 when water is discharged at a flow rate level set by the operation section 31 in the measured water discharge mode. Then, the controller 18B sets the opening area of the hot and cold water adjustment unit 13 at the start of discharge of water in the next measured water discharge mode to an opening area corresponding to the stored value.

With this configuration, water discharge can be started at the flow rate per unit time substantially corresponding to the flow rate level set by the operation section 31.

The invention claimed is:

1. A hot and cold water mixing device, comprising:
    a hot water supply path which is connected to a hot water supply and which allows hot water having a set temperature set by the hot water supply to flow through;
    a cold water supply path which is connected to a cold water supply and which allows cold water having an initial temperature to flow through;
    a hot and cold water adjustment unit configured to mix hot water flowing from the hot water supply path and cold water flowing from the cold water supply path with each other so as to provide mixed water having an adjusted temperature and an adjusted flow rate;
    a mixed water path which is connected to the hot and cold water adjustment unit and which allows mixed water to flow through;
    a water shut-off switch configured to switch between stopping and passing of mixed water,
    a mixed water path flowmeter which is disposed in the mixed water path and configured to measure a flow rate of mixed water,
    a flowmeter which is disposed in only one of the hot water supply path and the cold water supply path which has a higher flow rate than a remaining one of the hot water supply path and the cold water supply path, the flowmeter being configured to measure a corresponding flow rate of a flow rate of hot water in the hot water supply path or a flow rate of cold water in the cold water supply path, and
    at least a first temperature sensor and a second temperature sensor which are individually disposed in at least two of the hot water supply path, the cold water supply path, and the mixed water path, wherein
    the hot and cold water adjustment unit is configured to adjust a volume of hot water and a volume of cold water based on measurement values of the flowmeter disposed in only one of the hot water supply path and the cold water supply path which has a higher flow rate than a remaining one of the hot water supply path and the cold water supply path, the mixed water path flowmeter, and at least the first temperature sensor and the second temperature sensor.

2. The hot and cold water mixing device according to claim 1, wherein either the hot water supply path or the cold water supply path in which the flowmeter is disposed, is one of the supply paths which has a higher one of a hot water supply assumed flow rate and a cold water supply assumed flow rate, the higher one of the hot water supply assumed flow rate and the cold water supply assumed flow rate being determined based on the set temperature of the hot water supply, the initial temperature of the cold water supply, and a set temperature of the mixed water.

3. The hot and cold water mixing device according to claim 1, wherein
    the first temperature sensor is disposed in the hot water supply path, and the second temperature sensor is disposed in the cold water supply path.

4. The hot and cold water mixing device according to claim 1, wherein the first temperature sensor is disposed in the hot water supply path, the second temperature sensor is disposed in the cold water supply path, and a third temperature sensor is disposed in the mixed water path.

5. The hot and cold water mixing device according to claim 2, wherein
   the first temperature sensor is disposed in the hot water supply path, and
   the second temperature sensor is disposed in the cold water supply path.

6. The hot and cold water mixing device according to claim 2, wherein the first temperature sensor is disposed in the hot water supply path, the second temperature sensor is disposed in the cold water supply path, and a third temperature sensor is disposed in the mixed water path.

7. The hot and cold water mixing device according to claim 3, wherein the first temperature sensor is disposed in the hot water supply path, the second temperature sensor is disposed in the cold water supply path, and a third temperature sensor is disposed in the mixed water path.

* * * * *